No. 716,672.  
J. J. CRANE.  
CATTLE GUARD.  
(Application filed July 29, 1902.)  
Patented Dec. 23, 1902.

(No Model.)

WITNESSES:
Harry L. Amier,
B. J. Link.

INVENTOR
Joseph J. Crane,
BY Victor J. Evans
Attorney

UNITED STATES PATENT OFFICE.

JOSEPH J. CRANE, OF SUMMERTOWN, TENNESSEE.

CATTLE-GUARD.

SPECIFICATION forming part of Letters Patent No. 716,672, dated December 23, 1902.

Application filed July 29, 1902. Serial No. 117,498. (No model.)

*To all whom it may concern:*

Be it known that I, JOSEPH J. CRANE, a citizen of the United States, residing at Summertown, in the county of Lawrence and State of Tennessee, have invented certain new and useful Improvements in Cattle-Guards, of which the following is a specification.

This invention relates to cattle-guards, but more particularly to that class known as "surface guards;" and the object thereof is to provide a new and useful device of the character described adapted for use on railroads to prevent live stock—such as cattle, hogs, sheep, &c.—from passing from one inclosure into another, where partition-fences are intersected by said road.

The invention consists in a frame designed to be secured upon the road-bed provided with a plurality of equidistant slotted cleats, in which are secured an equal number of vertical guards in the form of angle-irons and provided with inclined laterally-projecting guard-fingers the edges of which are beveled toward the under side thereof, so as to have a sharp edge to impinge against or engage a hoof or leg of the animal, and thereby cause the withdrawal of the hoof and cause the animal to be frightened away from the guard and track.

In order to appreciate the advantages as well as the construction of this device, reference should be had to the accompanying drawings, in which—

Figure 1:
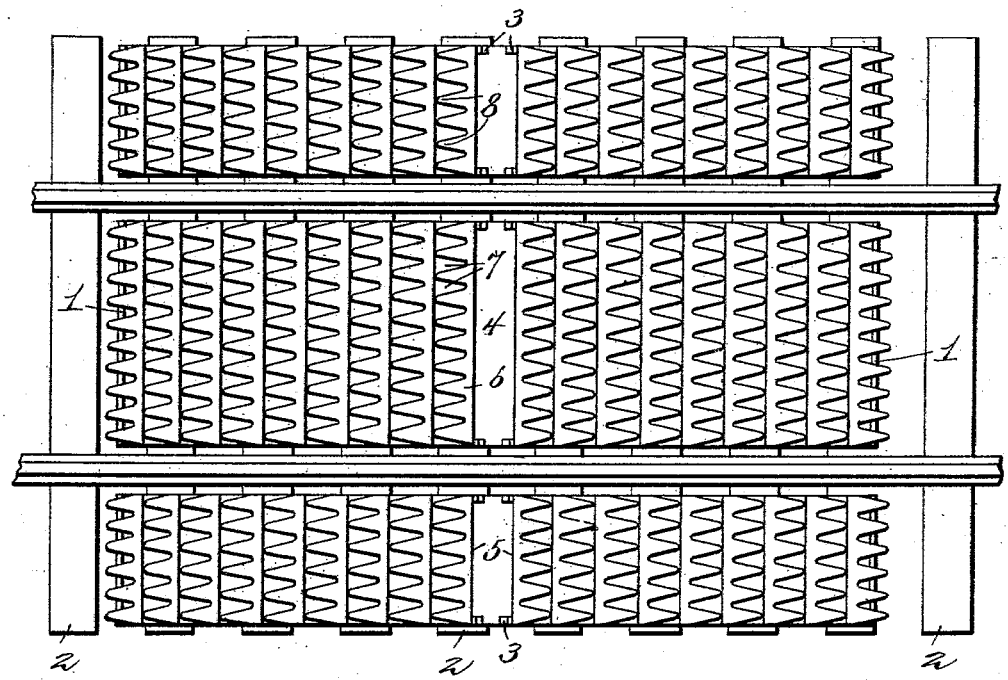
Figure 2:
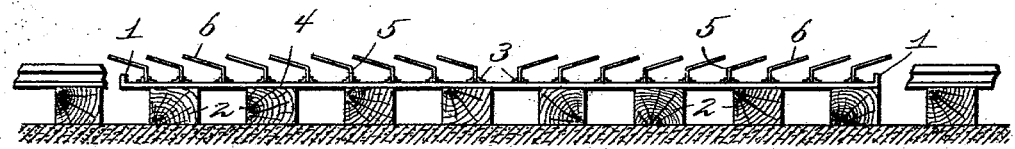
Figure 3:
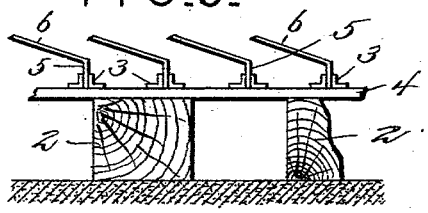
Figures 4, 5:
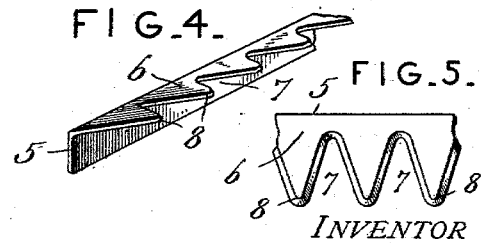

Figure 1 is a top plan view of a guard constructed in accordance with my invention and applied to a portion of a track. Fig. 2 is a side elevation of my invention. Fig. 3 is a fragmentary enlarged detail view of one of the side rails and a number of the guards. Fig. 4 is a detail perspective view of one of the guards detached. Fig. 5 is an enlarged fragmentary detail view of a portion of one of the guards.

The reference-numeral 1 designates an approximately rectangular frame secured by suitable means to the road-bed, preferably to the ties 2.

The reference-numeral 3 designates a plurality of cleats arranged on the side rails of the frame 1.

Seated in the slotted portion of the cleats 3 are guards 5, which are approximately L-shaped, each guard comprising a vertically-arranged elongated plate or strip, on the upper edge of which is a laterally-projecting upwardly-inclined flange 6, provided with slots or cut-out portions 7, arranged at suitable intervals to provide guard-fingers 8, the edges of which diverge from their free ends toward the rear of the flanges, so that the rear portions of the slots 7 are narrower than the forward portions. The edges of the fingers are chamfered or beveled, so that the lower surfaces of the fingers will be closer together than the top surfaces. The sharp edge is thus provided which will come in contact with the leg of the animal as it enters the slot, so that the discomfiture to the animal will cause it to withdraw its leg and the animal will be frightened away from the track. By providing the fingers with diverging edges the slots are so formed that the legs of the smaller animals, as well as the larger ones, will be engaged and cause them to back away from the track.

It will be noticed that the guard-fingers point in opposite directions on each side of the center of the frame. The object of so arranging them is to provide means whereby the animals will back in opposite directions, according to the side in which they first enter on the guard.

It is to be observed that each guard-strip is removably secured in the cleats, so that in the event that one of the guards becomes broken or mutilated in any way it can be readily removed and a new one substituted without affecting the relative position of the others. It will therefore be apparent that I have provided a cheap, durable, and efficient guard for the purpose for which it is intended and that it may be applied to any road and after it is once in place any broken parts can be replaced without affecting the rest of the structure.

Having described my invention, what I claim is—

1. A cattle-guard comprising a frame, cleats equidistantly arranged on said frame, and removable strips vertically engaging the cleats and provided at their top edges with laterally-projecting upwardly-inclined guard-fingers spaced apart and having their edges beveled to form sharp edges.

2. A guard-strip for cattle-guards being approximately L-shaped in cross-section and cut out at intervals to form guard-fingers provided with edges diverging toward the end, said edges being beveled from the top to the under side of the fingers, whereby the lower surfaces of the fingers are closer together than the upper surfaces.

In testimony whereof I affix my signature in presence of two witnesses.

JOSEPH J. CRANE.

Witnesses:
THOS. A. BARNES,
L. J. DAWES.